United States Patent [19]
Sauvage

[11] 3,830,695
[45] Aug. 20, 1974

[54] NUCLEAR REACTOR

[75] Inventor: Michel Sauvage, Aix-en-Provence, France

[73] Assignee: Commissariat A L'Energie Atomique, Paris, France

[22] Filed: May 15, 1972

[21] Appl. No.: 253,021

[30] Foreign Application Priority Data
May 24, 1971 France............................. 71.18628

[52] U.S. Cl..................................... 176/38, 176/65
[51] Int. Cl............................................... G21c 9/00
[58] Field of Search............. 176/37, 38, 87, 63, 65, 176/40

[56] References Cited
UNITED STATES PATENTS
3,398,493  8/1968  Massey ................................ 176/87
3,548,931  12/1970  Germer et al......................... 176/40

FOREIGN PATENTS OR APPLICATIONS
966,665  8/1964  Great Britain........................ 176/87
1,214,439  12/1970  Great Britain........................ 176/38

OTHER PUBLICATIONS
ANL–6377, August 1961, pp. 9, 10, 14, 15, 16, 17.

*Primary Examiner*—Harvey E. Behrend
*Attorney, Agent, or Firm*—Cameron, Kerkam, Sutton, Stowell & Stowell

[57] ABSTRACT

A nuclear reactor comprising a vessel containing a liquid metal for cooling the reactor core and a roof closing the top of the vessel, the roof being associated with a coolant circuit comprising a first part immersed in the liquid metal in the vessel and a second part secured to the roof, characterised in that the two parts are connected to one another in series and also respectively connected to inlet and discharge collectors for the coolant, the circuits being formed by at least one continuous pipe disposed in the immediate neighborhood of the inner surface of the vessel in the first part of the circuit and next to the roof in the second part of the circuit, the inlet and discharge collectors being disposed outside the vessel.

3 Claims, 1 Drawing Figure

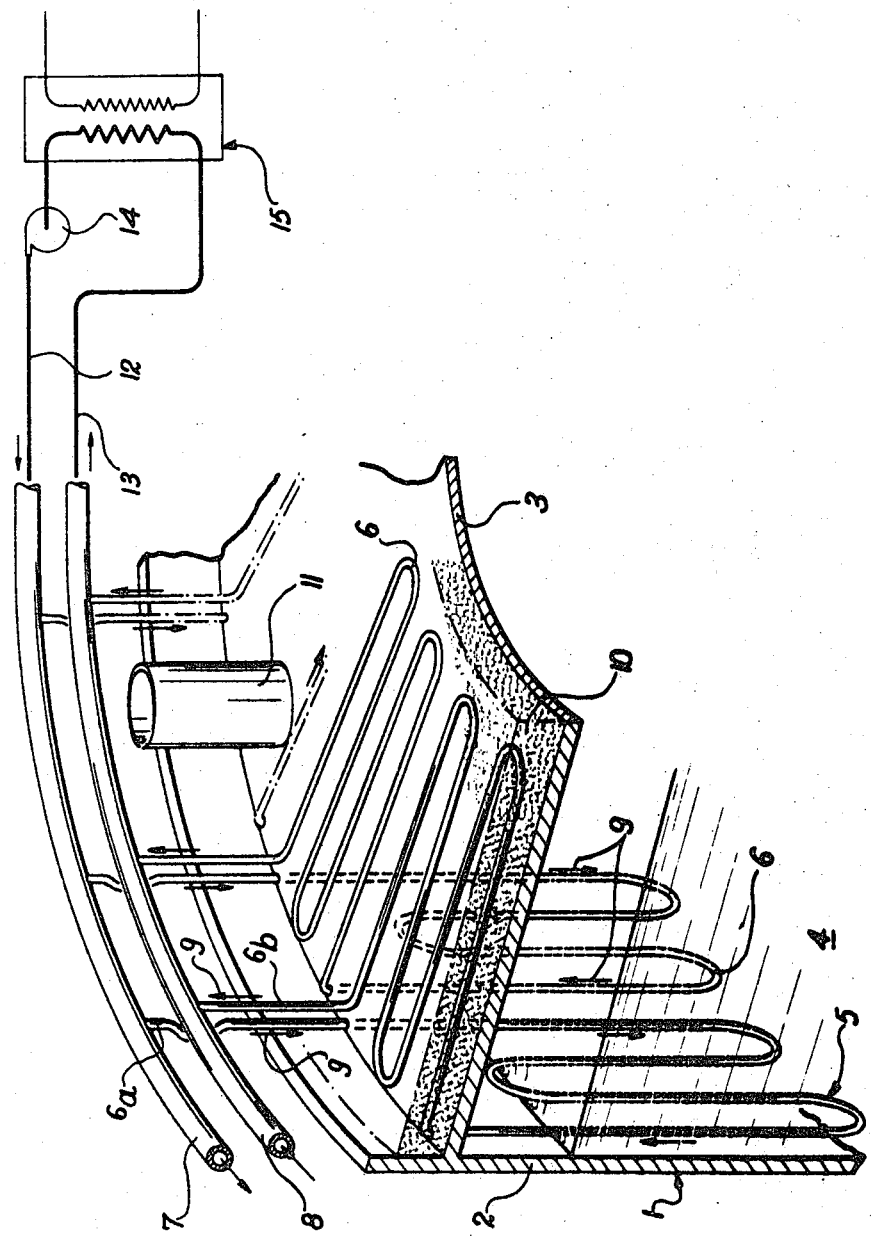

NUCLEAR REACTOR

The invention relates to a nuclear reactor, and in particular a fast neutron reactor, wherein the core or active part is disposed inside a sealing-tight metal vessel externally lined by a thick envelope giving protection against radiation and containing a liquid metal, usually sodium, flowing in contact with the fuel elements in the core in order to extract the heat liberated by nuclear fission, the heated sodium or primary fluid in turn yielding its heat in heat exchangers to a secondary fluid, the expansion of which can be used outside the reactor in an electricity generator. In some types of reactor, it may be necessary to add an intermediate fluid between the primary fluid and the secondary fluid whose expansion is used. The invention applies more particularly, among reactors of the last-mentioned kind, to those wherein the heat exchangers and the sodium circulating pumps are mounted inside the metal vessel around the core, the top part of the core comprising a horizontal closing roof formed with orifices giving access to the interior of the vessel, for example, for equipment (pumps, exchangers, purifiers, etc.) operating inside the vessel, and for manipulating the fuel elements.

In a reactor of the aforementioned kind, or "integrated" reactor, the roof presents certain problems, including that of controlling its temperature changes in dependence on the temperature of the sodium, which may vary within wide limits, sometimes very rapidly. For the sake of mechanical efficiency, for example in order to enable it to withstand any excess pressures, the roof should be very rigid, with the result usually that it has high thermal inertia. Since the roof is usually immersed in a gas, it cannot follow changes in the temperature of the vessel containing sodium, which has a lower thermal inertia. Consequently, the permissible difference between the average temperature of the roof and that of the top part of the vessel, at the place where the roof is connected to the vessel, should remain low in order to avoid stresses and deformation at the place where the vessel is joined to the roof, such as to impair the mechanical efficiency of the last-mentioned part of the reactor.

A particular problem occurs when the temperature of the vessel varies very suddenly, more particularly if a fault occurs in one of the sodium cooling circuits or if the reactor makes an emergency stop. Owing to its high thermal inertia and the bad heat transfer conditions, the roof temperature cannot follow that of the vessel, which always remains very close to the temperature of the sodium. There is thus a risk of damage at the place where the roof is connected to the vessel.

The invention relates to a nuclear reactor of the aforementioned kind wherein the roof comprises a device enabling it to rapidly and faithfully follow variations in the temperature of the sodium in the vessel, without in any way affecting the mechanical rigidity and other properties of the roof.

According to the invention the roof of the vessel is associated with a coolant circuit comprising a first part immersed in the liquid metal in the vessel and a second part secured to the roof, wherein the two parts are connected to one another in series and are also respectively connected to inlet and discharge collectors for the coolant, the circuits being formed by at least one continuous pipe disposed in the immediate neighborhood of the inner surface of the vessel in the first part of the circuit and next to the roof in the second part of the circuit, the inlet and discharge collectors being disposed outside the vessel.

The coolant may be sodium or sodium-potassium eutectic.

According to a subsidiary feature of the invention, the pipe for circulating the coolant forms a series of hairpin bends which, without affecting the overall dimensions, increase the length travelled by the fluid in each of the two parts of the circuit, i.e., in the neighborhood of the wall of the vessel and in contact with the roof.

In one embodiment of the invention, the continuous pipe, in the second part of the circuit, is welded to the top of the roof and embedded in a layer having a thickness suitable for a coolant substance. Outside the vessel, the collectors may or may not be connected by a circulating pump to an auxiliary heat exchanger for adjusting the temperature of the coolant.

Other features of the nuclear reactor in question will be clear from the following description of an exemplary non-limitative embodiment referring to the single accompanying drawing, which is a diagrammatic partial view in perspective of the top of a reactor vessel and of its horizontal roof, the assembly being associated with a coolant circuit according to the invention.

In the drawing, reference 1 denotes the vessel of a fast neutron nuclear reactor of the "integrated" kind, the main features of which have already been described. The vessel, only part of which is shown in the drawing, mainly consists of an axially vertical, cylindrical lateral ring 2 closed at the top by a metal plate 3 forming the vessel roof. The vessel contains a sufficient volume of sodium to cool the reactor core (not shown) during operation. The sodium level in the vessel is diagrammatically shown by reference 4.

According to the invention, vessel 1 is associated with a circuit 5 for a coolant which may likewise be sodium or sodium-potassium eutectic. In the example, circuit 5 is in the form of a continuous pipe 6 forming a series of successive hairpin bends, extending in two particular directions. In the first direction, the hairpin bends parallel with the inner wall of ring 2 are disposed in the immediate neighborhood of ring 2 and extend at least partly below the level 4 of the liquid sodium. In the second direction, the hairpin bends extend through roof 3 and parallel thereto on its upper surface and are preferably directly welded thereon. The ends 6a and 6b of the resulting pipe 6 are joined to two coolant collectors 7, 8 respectively, the direction of flow of the coolant in pipe 6 being shown diagrammatically by arrows 9. The hairpin bends disposed above roof 3 are also embedded in a suitable thickness 10 of a heat-insulating material.

Preferably, coolant circuit 5 is subdivided into a number of adjacent sub-assemblies each comprising a pipe 6 formed into successive hairpin bends in the aforementioned manner, the pipes being distributed on roof 3 so as to follow the circular shape of ring 2, in adjacent angular sectors. All the pipes are then connected in parallel to collectors 7 and 8, which are common to the assembly. The pipes are disposed on roof 3 so as to leave a free orifice for ducts 11, which extend through different regions of roof 3 so as to give direct access to the interior of vessel 1, e.g., in order to manipulate fuel elements in the core or to position reactor equipment such as pumps or heat exchangers.

During normal operation, the coolant flowing inside the aforementioned pipes is at the same temperature as the sodium in the vessel in contact with the lateral ring 2 thereof. When the temperature of the sodium increases, the coolant flowing inside that part of pipe 6 immersed in the sodium, immediately and exactly follows the temperature change. The recorded temperature change is then directly transmitted to roof 3 via the hairpin bends in contact with the top of the roof. Consequently, if the pipes are of suitable size and are suitably disposed on the roof, the resulting temperature gradient is minimal and has practically no effect on the mechanical performance of the roof.

The coolant in circuit 5 can be made to flow either by natural convection or alternatively by continuous pumping. In the latter case, collectors 7, 8 are connected to two pipes 12, 13 disposed in a loop comprising a circulating pump 14 and an auxiliary heat exchanger 15, the latter being used during reactor operation to adjust the temperature of the coolant in pipe 6 along the inner wall of ring 2 to a preset value independent of the temperature of the sodium in the reactor vessel, so that the metal operates under more favourable conditions than if it followed the changes in the temperature of the primary sodium. Advantageously, to this end, heat-insulating panels may be immersed in the sodium to form a heat shield between the hairpin circuit and the primary sodium in the reactor.

If the heat exchanger, the circuit and the immersed hairpin device are suitably dimensioned, they can be used to evacuate the residual power of the reactor under normal conditions after the reactor stops, or in emergency, after a deviation from the normal output capable of damaging the exchange circuits normally provided for this purpose.

I claim:

1. A nuclear reactor comprising a reactor core, a vessel containing the reactor core and a liquid metal for cooling the reactor core, a roof integral with the vessel closing the top of the vessel, a coolant circuit for the roof comprising a first part immersed in the liquid metal in the vessel and a second part in the plane of and secured to the roof, the two parts being connected in series, inlet and discharge collectors for the coolant connected to the two parts, at least one continuous pipe forming the two parts disposed in the immediate neighborhood of the inner surface of the vessel in the first part of the circuit and on the roof in the second part of the circuit, the inlet and discharge collectors being disposed outside the vessel, the pipe forming a series of hairpin bends increasing the length travelled by the coolant in each of the two parts of the circuit in the neighborhood of the wall of the vessel and in contact with the roof, the pipe of the second part of the circuit being welded to the top of the roof and covered by a layer of a heat-insulating substance.

2. A nuclear reactor according to claim 1, that the coolant being selected from the group consisting of sodium and sodium-potassium eutectic.

3. A nuclear reactor according to claim 1, the collectors being connected by a circulation pump to an auxiliary heat exchanger for adjusting the temperature of the coolant.

* * * * *